(12) United States Patent
Shin et al.

(10) Patent No.: US 7,870,326 B2
(45) Date of Patent: Jan. 11, 2011

(54) MULTIPROCESSOR SYSTEM AND METHOD THEREOF

(75) Inventors: Yun-Hee Shin, Suwon-si (KR); Han-Gu Sohn, Suwon-si (KR); Young-Min Lee, Gyeonggi-do (KR); Ho-Cheol Lee, Yongin-si (KR); Soo-Young Kim, Hwaseong-si (KR); Dong-Hyuk Lee, Seoul (KR); Chang-Ho Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 734 days.

(21) Appl. No.: 11/819,601

(22) Filed: Jun. 28, 2007

(65) Prior Publication Data

US 2008/0172516 A1 Jul. 17, 2008

(30) Foreign Application Priority Data

Jul. 28, 2006 (KR) ...................... 10-2006-0071455
Nov. 15, 2006 (KR) ...................... 10-2006-0112555

(51) Int. Cl.
G06F 12/00 (2006.01)

(52) U.S. Cl. ........................... 711/5; 711/147; 711/148; 711/149; 365/230.05

(58) Field of Classification Search ...................... 711/5, 711/131, 147–149; 365/230.05
See application file for complete search history.

(56) References Cited

U.S. PATENT DOCUMENTS 6,167,487 A 12/2000 Camacho et al.
6,816,889 B1 * 11/2004 Graham ...................... 709/213

(Continued)

FOREIGN PATENT DOCUMENTS

JP 63-010398 1/1988

(Continued)

OTHER PUBLICATIONS

Korean Notice of Allowance dated Jun. 27, 2008 in corresponding Korean Patent Application No. 10-2006-0112555.

*Primary Examiner*—Jasmine Song
(74) *Attorney, Agent, or Firm*—Harness, Dickey & Pierce, P.L.C.

(57) ABSTRACT

A multiprocessor system and method thereof are provided. The example multiprocessor system may include first and second processors, a dynamic random access memory having a memory cell array, the memory cell array including a first memory bank coupled to the first processor through a first port, second and fourth memory banks coupled to the second processor through a second port, and a third memory bank shared and connected with the first and second processors through the first and second ports, and a bank address assigning unit for assigning bank addresses to select individually the first and second memory banks, as the same bank address through the first and second ports, so that starting addresses for the first and second memory banks become equal in booting, and assigning bank addresses to select the third memory bank, as different bank addresses through the first and second ports, and assigning, through the second port, bank addresses to select the fourth memory bank, as the same bank address as a bank address to select the third memory bank through the first port.

12 Claims, 14 Drawing Sheets

U.S. PATENT DOCUMENTS

2003/0093628 A1 * 5/2003 Matter et al. ................ 711/153

FOREIGN PATENT DOCUMENTS

| JP | 01-106148 | 4/1989 |
| JP | 2000-215659 | 8/2000 |
| JP | 3593346 | 9/2004 |
| KR | 1997-0051155 | 7/1997 |
| KR | 10-2006-0090083 | 8/2006 |
| KR | 10-0686304 | 2/2007 |

* cited by examiner

FIG. 13

| | PORT A | PORT B | FEATURE |
|---|---|---|---|
| CASE1 (FIG. 7) | SHARED BA (01 / 00) | 11 / 10 / (01) | NO "00" IN PORT B |
| CASE2 (FIG. 8) | SHARED BA (01 / 00) | 01 / 00 / (10) | NO "11" IN PORTS A, B |
| CASE3 (FIG. 9) | SHARED BA (11 / 00) | 10 / 01 / (00) | NONSERIAL IN BA OF PORT A |
| CASE4 (FIG. 10) | SHARED BA (11 / 00) | 01 / 00 / (11) | NO "10" IN PORTS A, B NONSERIAL IN BA OF PORT A |
| CASE5 (FIG. 11) | SHARED BA (00 / 01) | 11 / 10 / (00) | SHARED BANK START |
| CASE6 (FIG. 12) | SHARED BA (11 / 00) | 10 / 01 / (11) | NO "00" IN PORT B NONSERIAL IN BA OF PORT A |

MULTIPROCESSOR SYSTEM AND METHOD THEREOF

PRIORITY STATEMENT

This U.S. nonprovisional patent application claims priority under 35 U.S.C. §119 to Korean Patent Applications 10-2006-0071455 filed on Jul. 28, 2006, and 10-2006-0112555 filed on Nov. 15, 2006, the entire contents of which are hereby incorporated by reference.

BACKGROUND OF THE INVENTION

1. Field of the Invention

Example embodiments of the present invention relate generally to a multiprocessor system and method thereof, and more particularly to a multiprocessor system and method of assigning bank addresses to memory banks within the multiprocessor system.

2. Description of the Related Art

A semiconductor memory device including a plurality of access ports may be referred to as a multiport memory. A memory device having two access ports may further be referred to as a dual-port memory. A conventional dual-port memory may be, for example, an image processing video memory having a random access memory (RAM) port accessible in a random sequence and a serial access memory (SAM) port accessible in a serial sequence.

A dynamic random access memory (DRAM) may read from or write to a shared memory area through a plurality of access ports in a memory cell array not having an SAM port, and may be called a multipath accessible semiconductor memory device, as distinguished from a multiport memory.

Conventional portable electronic systems, such as a handheld multimedia player or handheld phone, a notebook computer, a PDA, etc., may include multiprocessor systems employing plural processors, as shown in FIG. 1, in order to obtain higher performance.

FIG. 1 is a block diagram of a conventional multiprocessor system within a portable communication device.

Referring to FIG. 1, a first processor 10 and a second processor 12 may be connected through a connection line L10, and a NOR memory 14 and a DRAM 16 may be coupled with the first processor 10 through buses B1-B3, and a DRAM 18 and a NAND memory 20 may be coupled with the second processor 12 through buses B4-B6. The first processor 10 may have a MODEM function for performing a modulation and demodulation of a communication signal, and the second processor 12 may have an application function for dealing with communication data, games, etc. A NOR memory 14 having a NOR structure with a cell array configuration, and a NAND memory 20 having a NAND structure with a cell array configuration, may each be nonvolatile memories having a transistor memory cell with a floating gate. The nonvolatile memory may be adapted to store data in a "solid state", such that data may be maintained even if a supply power is lost.

However, in a multi processor system such as illustrated in FIG. 1, DRAMs may correspond to and may be assigned to each processor, and lower-speed interfaces (e.g., UART, SPI, SRAM, etc.) may be used internally, such that a circuit complexity may be increased and an operational speed may be lower.

FIG. 2 is a block diagram of a conventional multiprocessor system including a semiconductor memory.

Referring to FIG. 2, a single DRAM 17 may be coupled to the first and second processors 10 and 12 through buses B1 and B2. The DRAM 17 may include two ports (e.g., one for each respective processor) to allow each processor 10 and 12 to access the DRAM 17 through each path in the structure of a multi processor system shown in FIG. 2. The two ports of the DRAM 17 may be connected to the first and second processors 10 and 12 via the buses B1 and B2, respectively.

FIG. 3 is a block diagram illustrating a conventional DRAM 1. In an example, the DRAM 1 may include a single port PO.

Referring to FIG. 3, the DRAM 1 may include a memory cell array having first to fourth banks 3, 4, 5 and 6, each corresponding to and connected with a row decoder 8 and a column decoder 7. An upper input/output sense amplifier and driver 13 may be operationally coupled to the first bank 3 or third bank 5 through multiplexer 11, 12, and a lower input/output sense amplifier and driver 13 may be operationally coupled to the second bank 4 or fourth bank 6 through multiplexer 14, 15.

Referring to FIG. 3, in an example, in selecting a memory cell of the first bank 3 and in reading data stored in the selected memory cell, an output procedure of the read data is as follows. A selected word line may be activated, and data of a memory cell may be sensed and amplified by a bit line sense amplifier and transferred to a local input/output line 9 according to an activation of corresponding column selection line CSL. Data transferred to the local input/output line 9 may be transferred to a global input/output line GIO by a switching operation of first multiplexer 21, and a second multiplexer 11 connected to global input/output line GIO may transfer data of the global input/output line GIO to the upper input/output sense amplifier and driver 13. The data may be sensed again and amplified by the upper input/output sense amplifier and driver 13 and may be output to a data output line L5 through a path unit 16.

Referring to FIG. 3, in another example, in reading data stored in a memory cell of the fourth bank 6, data may be output to an output terminal DQ, sequentially through a multiplexer 24, the multiplexer 14, the lower input/output sense amplifier and driver 13, the path unit 16 and the data output line L5. As described above, the DRAM 1 of FIG. 3 has a structure two banks share one input/output sense amplifier and driver, and is a single port memory an input/output of data is performed through one port PO. That is, the single-port DRAM 1 of FIG. 3 may be used within the system of FIG. 1, and may not be used within the multiprocessor system of FIG. 2 because the DRAM 1 includes a single port, and not dual ports.

FIG. 4 is a block diagram illustrating a conventional multiprocessor system 50.

Referring to FIG. 4, the multiprocessor system 50 may include a memory array 35 having first, second and third portions 33, 31 and 32, respectively. The first portion 33 of the memory array 35 may be accessed only by a first processor 70 through a port 37, and the second portion 31 may be accessed only by a second processor 80 through a port 38, and the third portion 32 may be accessed by each of the first and second processors 70 and 80. A size of the first and second portions 33 and 31 of the memory array 35 may vary based upon an operating load of the first and second processors 70 and 80, and the type of the memory array 35 may be either a memory type or disk storage type.

Referring to FIG. 4, the third portion 32 may be shared by the first and second processors 70 and 80 and the first and second portions 33 and 31 within the memory array 35 may be independently accessed by the first and second processors, respectively. Assigning an appropriate read/write path control for respective ports may be an important design criterion. The bank address may indicate an address to select a given bank if a memory cell array is divided into a plurality of banks, and may be distinguished from a memory cell address to select a given memory cell from among a plurality of memory cells disposed in a matrix type. For example, if four memory banks (e.g., 00, 01, 10, 11) are included, four corresponding bank addresses (e.g., 00, 01, 10, 11) may be used to select from among the four memory banks.

In assigning bank addresses, an operating system using processors or an address mapping of firmware may assign bank addresses such that starting or initial bank addresses of the "private" memory areas corresponding to ports are the same. As a number of processors in a multiprocessor system increases, assigning bank addresses may become a more important design characteristic in order to ensure efficient system operation.

SUMMARY OF THE INVENTION

An example embodiment of the present invention is directed to a method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select the first and second memory banks, as respectively separate bank addresses through the first and second ports and assigning bank addresses to select the third memory bank, as the same bank address through the first and second ports.

Another example embodiment of the present invention is directed to a method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select individually the first and second memory banks, as the same bank address through the first and second ports, so that starting addresses for the first and second memory banks become equal in booting and assigning bank addresses to select the third memory bank, as different bank addresses through the first and second ports.

Another example embodiment of the present invention is directed to a method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select individually the first and second memory banks, as different bank addresses through the first and second ports and assigning bank addresses to select the third memory bank, as different bank addresses through the first and second ports.

Another example embodiment of the present invention is directed to a method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select individually the first and second memory banks, as the same bank address through the first and second ports, so that starting addresses for the first and second memory banks become equal in booting and assigning bank addresses to select the third memory bank, as the same bank address through the first and second ports.

Another example embodiment of the present invention is directed to a method of assigning bank addresses to select banks in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select the first and second memory banks, as respectively separate bank addresses through the first and second ports and assigning bank addresses to select the third memory bank, as the same bank address through the first and second ports, so that starting addresses for the third memory bank become equal in the first and second ports in booting.

Another example embodiment of the present invention is directed to a method of assigning bank addresses to select banks in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising assigning bank addresses to select the first and second memory banks, as respectively separate bank addresses through the first and second ports and assigning bank addresses to select the third memory bank, as the same bank address through the first and second ports, so that memory cell addresses for the third memory bank become equal in the first and second ports in booting.

Another example embodiment of the present invention is directed to a method of assigning bank addresses to select banks, in a semiconductor memory device having a memory cell array, the memory cell array including a first memory bank coupled to a first processor through a first port, second and fourth memory banks coupled to a second processor through a second port, and a third memory bank shared and connected with the first and second processors through the first and second ports, the method comprising assigning bank addresses to select individually the first and second memory banks, as the same bank address through the first and second ports, so that starting addresses for the first and second memory banks become equal in booting, assigning bank addresses to select the third memory bank, as different bank addresses through the first and second ports, and assigning, through the second port, bank addresses to select the fourth memory bank, as the same bank address as a bank address to select the third memory bank through the first port, whereby with an unused bank address.

Another example embodiment of the present invention is directed to a data communication system comprising first and second processors, a volatile semiconductor memory device having a memory cell array, the memory cell array including a first memory bank coupled to the first processor through a first port, a second memory bank coupled to the second processor through a second port, and a third memory bank shared and connected with the first and second processors through the first and second ports, and a bank address assigning unit, the bank address assigning unit being operationally connected between the first and second processors and the volatile semiconductor memory device, and being for assigning bank addresses to select individually the first and second memory banks, as the same bank address through the first and second ports, so that starting addresses for the first and second memory banks become equal in booting, and being for assigning bank addresses to select the third memory bank, as different bank addresses through the first and second ports.

Another example embodiment of the present invention is directed to a data processing system comprising first and second processors, a dynamic random access memory having a memory cell array, the memory cell array including a first memory bank coupled to the first processor through a first port, second and fourth memory banks coupled to the second processor through a second port, and a third memory bank shared and connected with the first and second processors through the first and second ports and a bank address assigning unit for assigning bank addresses to select individually the first and second memory banks, as the same bank address through the first and second ports, so that starting addresses for the first and second memory banks become equal in booting, and assigning bank addresses to select the third memory bank, as different bank addresses through the first and second ports, and assigning, through the second port, bank addresses to select the fourth memory bank, as the same bank address as a bank address to select the third memory bank through the first port.

Another example embodiment of the present invention is directed to a method of assigning bank addresses, in a multi-path accessible semiconductor memory device including at least one shared memory area and private memory areas in a memory cell array, the at least one shared memory area being operationally connected with ports independently installed corresponding to the number of plural processors, and being selectively accessed by the plural processors, and the private memory areas being privately accessed corresponding to the plural processors, the method comprising assigning bank addresses so as to cause all starting bank addresses of a private memory area corresponding to each of the ports, to become equal to each other.

Another example embodiment of the present invention is directed to a method of assigning bank addresses, in a multi-path accessible semiconductor memory device including at least one shared memory area and private memory areas in a memory cell array, the at least one shared memory area being operationally connected with ports independently installed corresponding to the number of plural processors, and being selectively accessed by the plural processors, and the private memory areas being privately accessed corresponding to the plural processors, the method comprising assigning bank addresses to cause all starting bank addresses of a private memory area corresponding to each of the ports become different from each other.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

FIG. 13 is a table illustrating an assignment of bank addresses of FIGS. 7 to 12 according to another example embodiment of the present invention.

DETAILED DESCRIPTION OF EXAMPLE EMBODIMENTS

Figure 1:
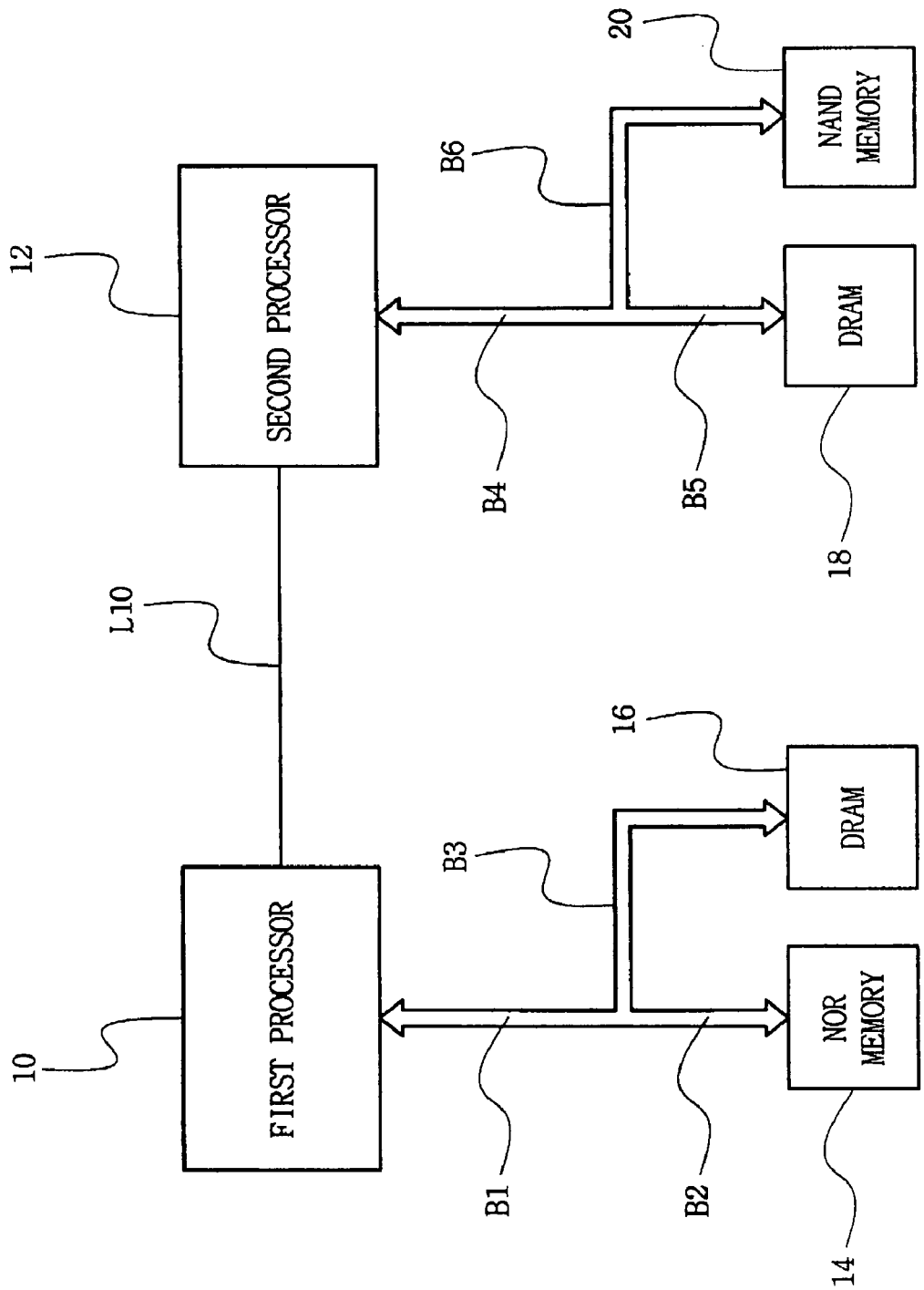
FIG. 1 is a block diagram of a conventional multiprocessor system within a portable communication device.
Figure 2:
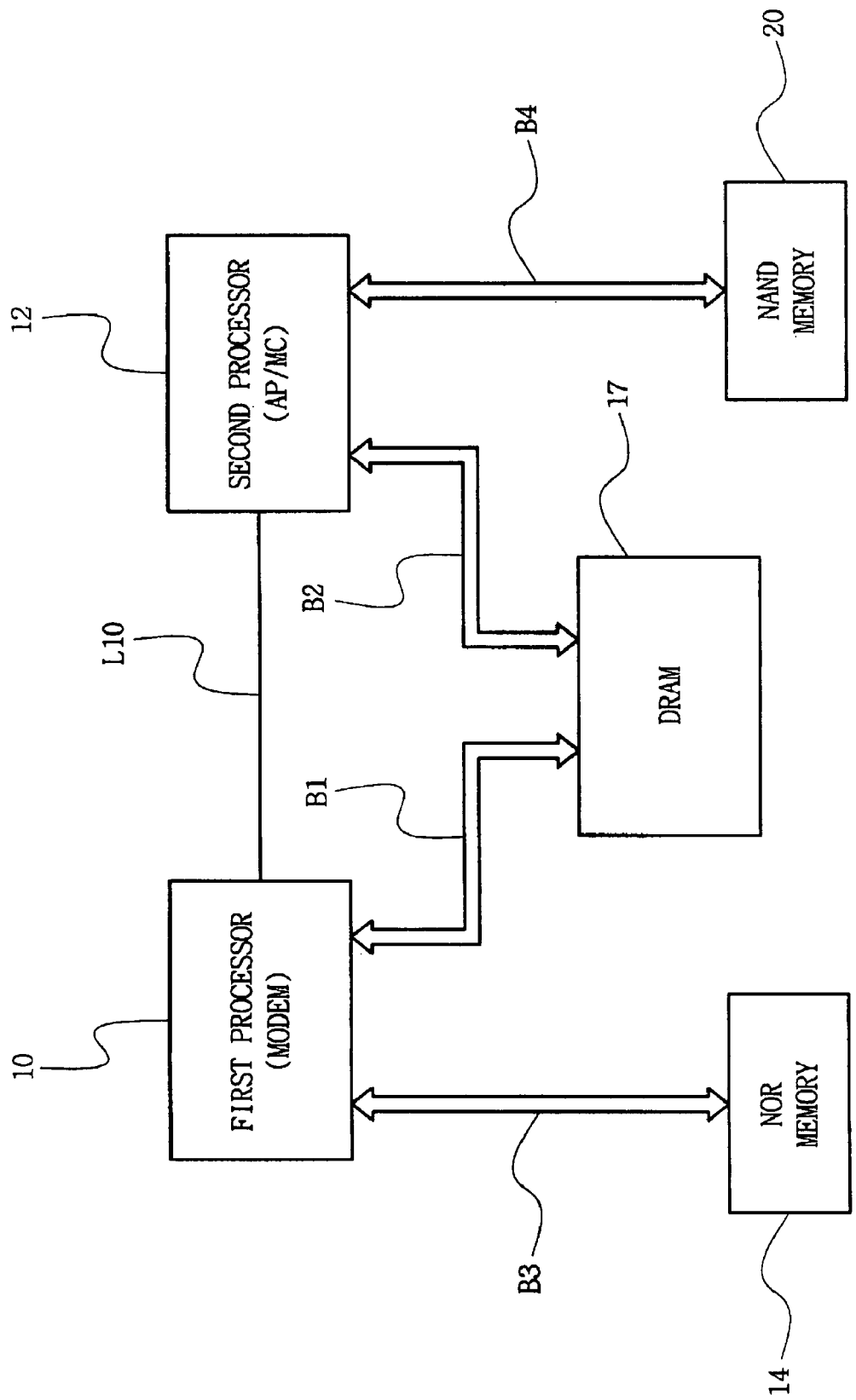
FIG. 2 is a block diagram of a conventional multiprocessor system including a semiconductor memory.
Figure 3:
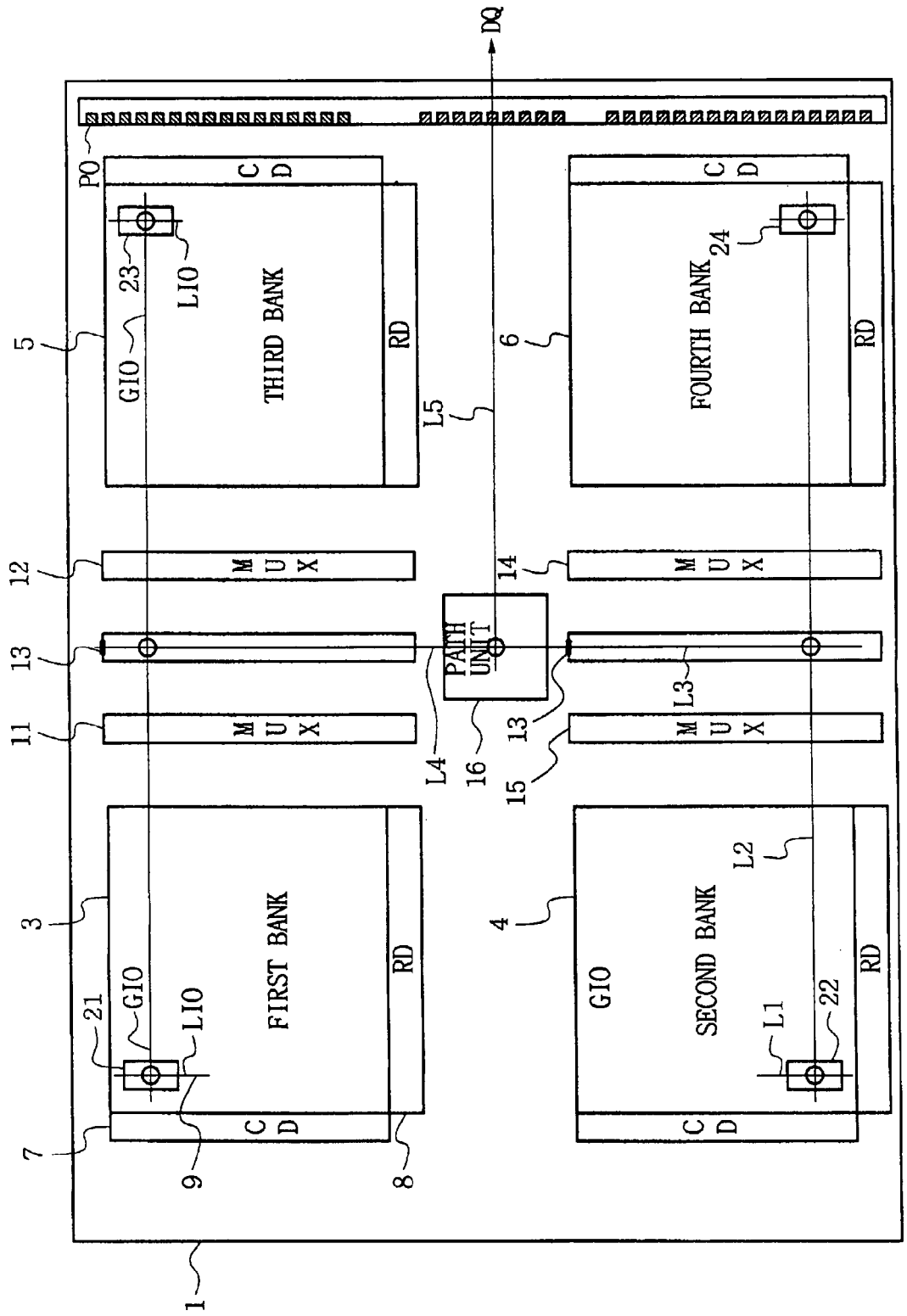
FIG. 3 is a block diagram illustrating a conventional dynamic random access memory (DRAM).
Figure 4:
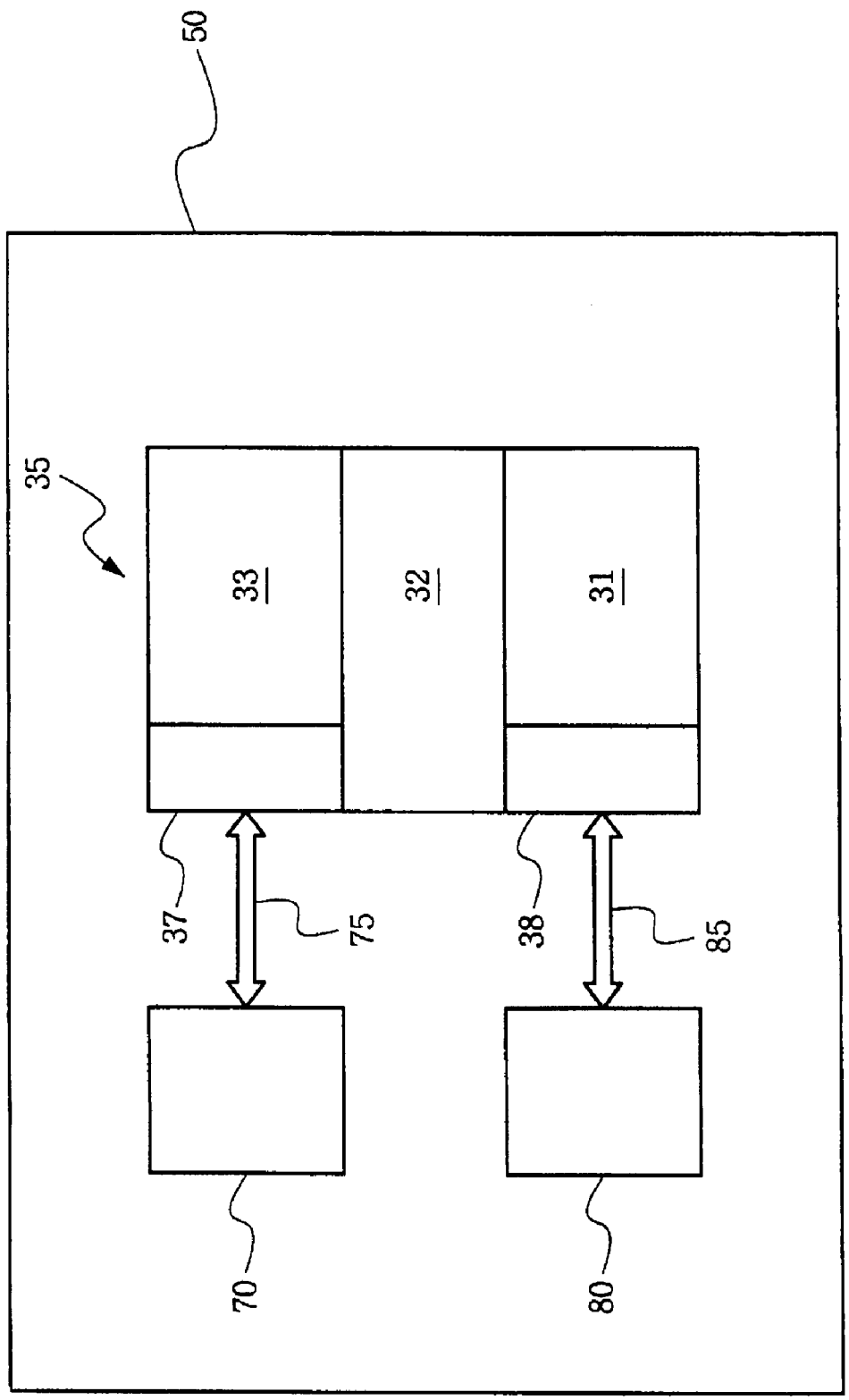
FIG. 4 is a block diagram illustrating a conventional multiprocessor system.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of clarity, a detailed description of known functions and systems for, for example, other illuminations, publishing methods, a decoding for addresses, accessing procedures, general dynamic random access memories and circuits, has been omitted.

Figure 5:
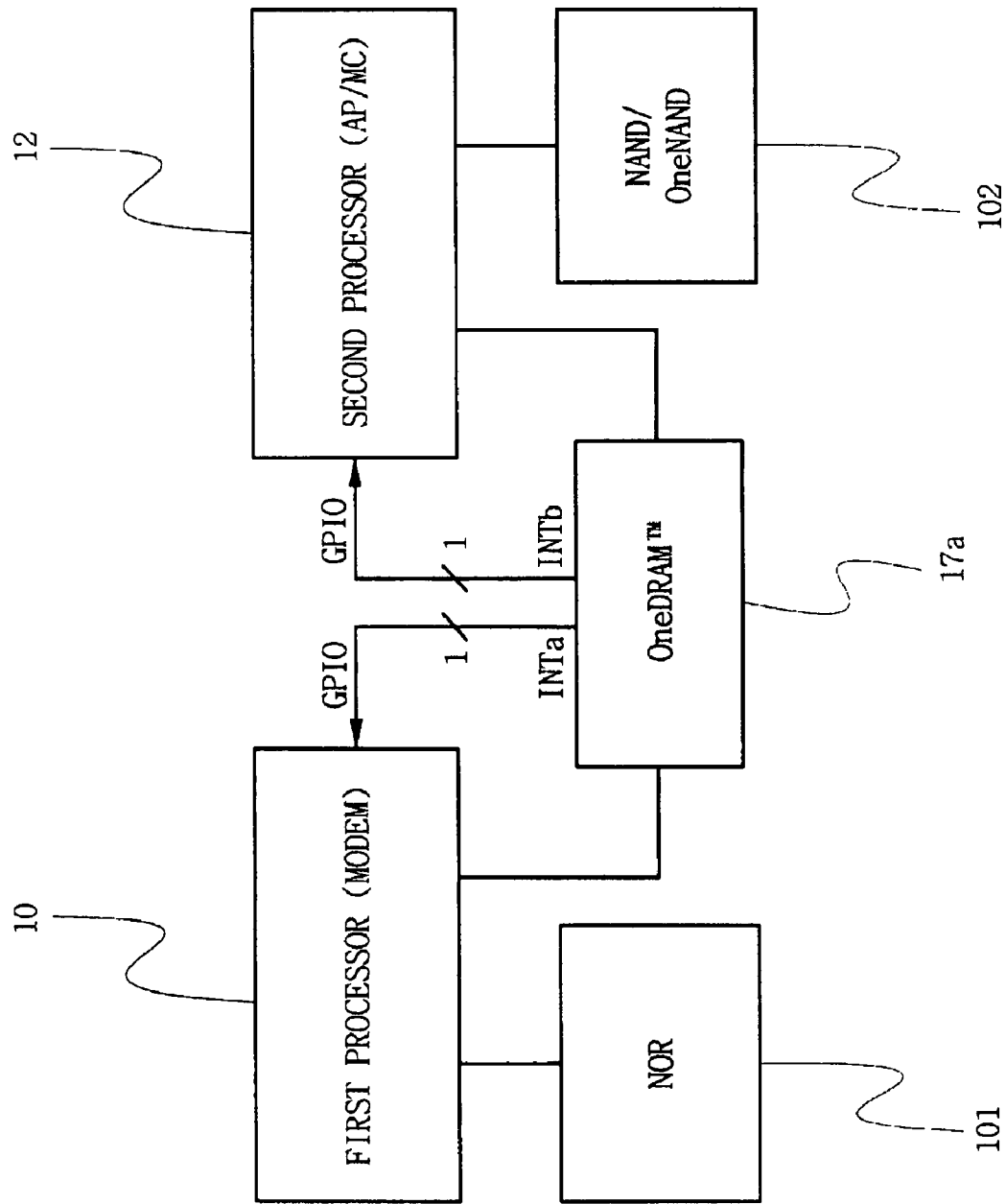
FIG. 5 is a block diagram illustrating a multiprocessor system according to an example embodiment of the present invention.

FIG. 5 is a block diagram illustrating a multiprocessor system according to an example embodiment of the present invention.

In the example embodiment of FIG. 5, the multiprocessor system, such as a data processing system or portable communication system, may include a first processor 10 for performing a first task, a second processor 12 for performing a second task, and a dynamic random access memory (DRAM) 17A having memory areas accessed by the first and second processors 10 and 20 within a memory cell array. The multiprocessor system may further include flash memories 101 and 102 connected with the first, second processor 10, 12.

In the example embodiment of FIG. 5, the DRAM 17A may be shown as including two independent ports, although it is understood that other example embodiments of the present invention may be directed to DRAMs, or other memory device types, having any number of ports. The DRAM 17A may include a port A or first port through which an output of signal INTa is output and a port B or second port through which an output of signal INTb is output. The first port may be connected to the first processor 10 through a general-purpose input/output (GPIO) line, and the second port may be connected to the second processor 12 through a general-purpose input/output (GPIO) line. In an example, the first processor 10 may have, as a processing task, a MODEM function of performing a modulation and demodulation of a communication signal, or alternatively a baseband processing function. The second processor 12 may have, as a processing task, an application function to process communication data (e.g., a game, a moving image, etc.). In another example, the second processor 12 may be a multimedia coprocessor.

In the example embodiment of FIG. 5, the flash memories 101 and 102 may be nonvolatile memories having, for example, a NOR or NAND structure, respectively, in a cell connection configuration of a memory cell array, and in which a memory cell may include a MOS transistor having a floating gate. The flash memories 101 and 102 may be mounted to store data in a "solid state", or data that may be retained even if a continuous power supply is not available.

In the example embodiment of FIG. 5, the DRAM 17A may be used to store commands and data to be executed in the processors 10 and 12. Further, the DRAM 17A may manage an interface function between the first and second processors 10 and 12. The processors 10 and 12 may perform a data communication through a commonly accessible shared memory area by using an interface unit within a DRAM having a semaphore area and mailbox areas. If a host interface between processors is provided in a memory, a plurality of processors may access an assigned shared memory area at a higher speed, thereby enhancing a data transmission and processing speed of a given system.

In the example embodiment of FIG. 5, the multiprocessor system may correspond to a portable computing device or portable communication device such as a mobile communication device (e.g., a cellular phone, a bi-directional radio communication system, a single-directional pager, a bi-directional pager, a personal communication system, a portable computer, etc.). However, it will be appreciated that other example embodiments of the present invention may deploy the multiprocessor system of FIG. 5 in any well-known multiprocessor system configuration.

In the example embodiment of FIG. 5, while two processors are illustrated, the number of processors may scale to any number of processors. The processors 10 and 12 may correspond to a microprocessor, CPU, digital signal processor, micro controller, reduced command set computer, complex command set computer, etc. However, it will be appreciated that other example embodiments of the present invention may include any well-known type of processor and/or any well-known combination of processors.

Examples of layouts for a plurality of memory banks included within the DRAM 17A of FIG. 5 will now be described in greater detail.

Figure 6:
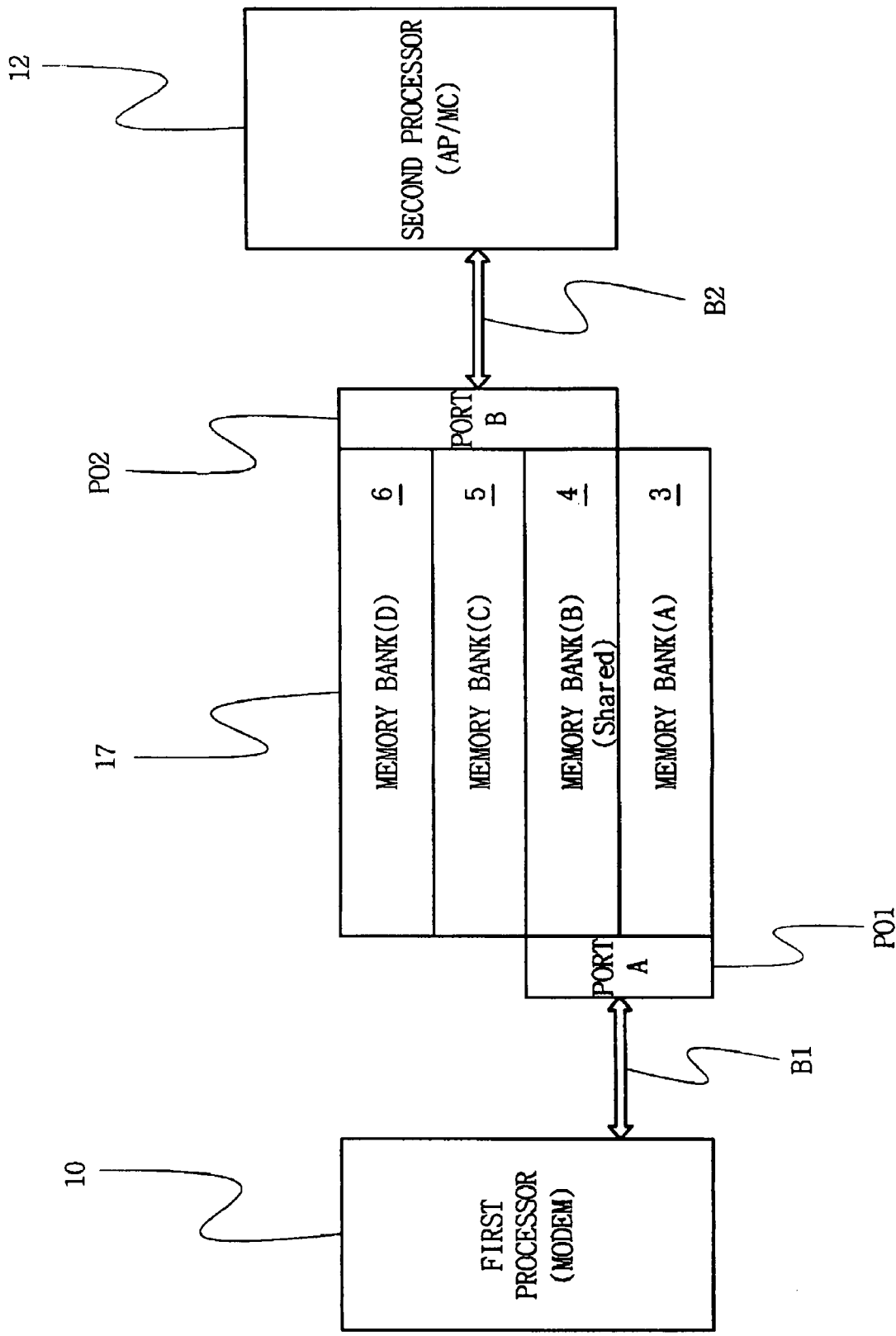
FIG. 6 is a block diagram of a memory layout of the multiprocessor system of FIG. 5 according to another example embodiment of the present invention.

FIG. 6 is a block diagram of a memory layout of the multiprocessor system of FIG. 5 according to another example embodiment of the present invention.

In the example embodiment of FIG. 6, four memory banks 3, 4, 5 and 6 may be disposed within the DRAM 17A, although it is understood that other example embodiments of the present invention may be directed to DRAMs having any number of memory banks. The memory bank A, 3 may be accessed by the first processor 10 through a first port PORT A, PO1, and the memory banks C, 5 and D, 6 may be accessed by a second processor 12 through a second port PORT B, PO2. The memory bank B, 4 may be accessed by each of the first and second processors 10 and 12 through the first and second ports PO1 and PO2. The memory bank B, 4 may be a shared memory area, and the memory banks A, 3, C, 5 and D, 6 may be "private" (e.g., non-shared) memory areas accessible by a single corresponding processor. Each of the four memory areas 3, 4, 5 and 6 may correspond to a unit of a bank in each DRAM 17A, with each bank having a memory storage of, for example, 64 MB, 128 MB, 256 MB, 512 MB, 1024 MB, etc.

In the example embodiment of FIG. 6, the DRAM 17A may include first memory bank 3 coupled to first processor 10 through first port PO1, second and fourth memory banks 5 and 6 coupled to second processor 12 through second port PO2, and a third memory bank 4 shared by and connected with the first and second processors 10 and 12 through the first and second ports PO1 and PO2.

FIGS. 7 to 12 illustrate alternative bank address assignments among the memory banks 3, 4, 5 and 6 of FIG. 6 according to example embodiments of the present invention.

Figure 7:
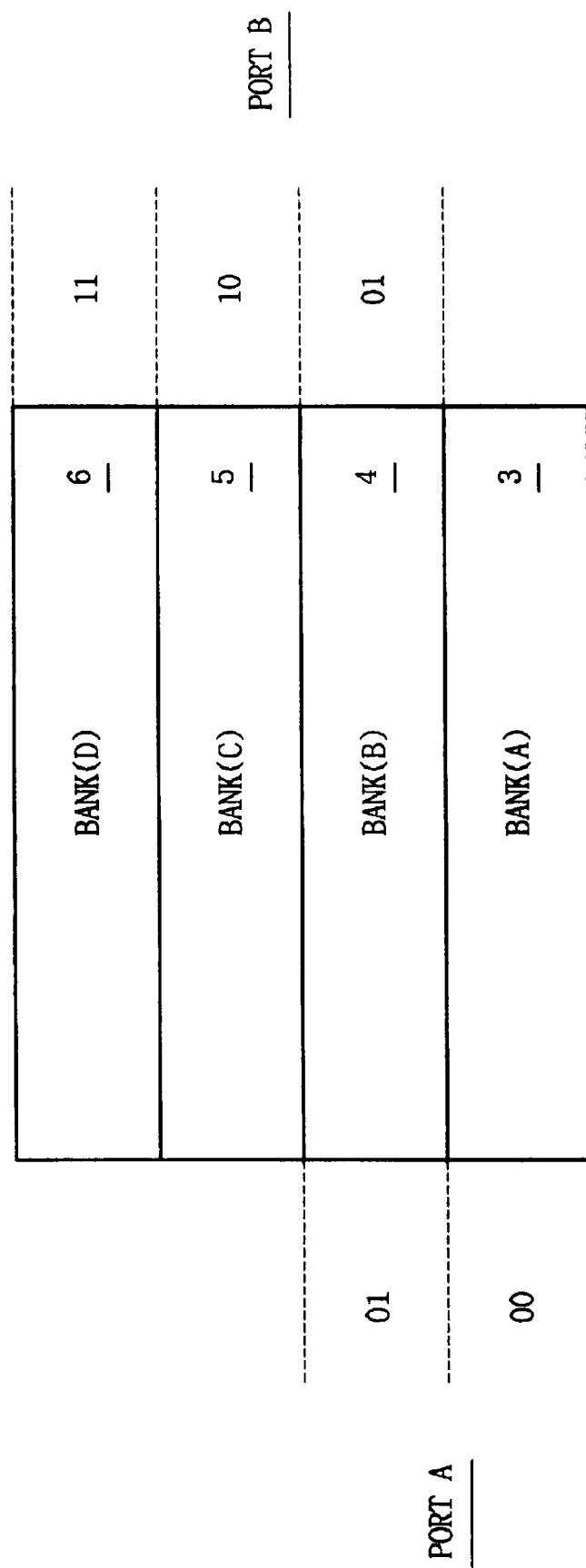
FIGS. 7 to 12 illustrate alternative bank address assignments among the memory banks within the memory layout of the multiprocessor system of FIG. 6 according to example embodiments of the present invention.

In the example embodiment of FIG. 7, the first and second memory banks 3 and 5 may be assigned different bank addresses through the first and second ports PO1 and PO2, and the third memory bank 4 may be assigned the same bank address through the first and second ports PO1 and PO2. The fourth memory bank 6 may be applied through the second port PO2, and may be assigned an upper or higher bank address than a bank address of the second memory bank 5. Accordingly, in an example, a bank address for memory bank A, 3 may be assigned "00" through first port PO1, and bank addresses for memory banks C, 5 and D, 6 may be assigned as "10" and "11", respectively, through second port PO2. A bank address for memory bank B, 4 may be assigned as "01" through both the first and second ports PO1 and PO2. Here, "00", "01", "10" and "11" may represent binary bit logic corresponding to a 2-bit address used to select among four memory banks.

In the example embodiment of FIG. 7, the memory bank B, 4 may be a shared memory bank by each of the first and second processors 10 and 12, in an initial booting or boot operation. For example, either processor may be granted access to the memory bank B, 4.

Figure 8:
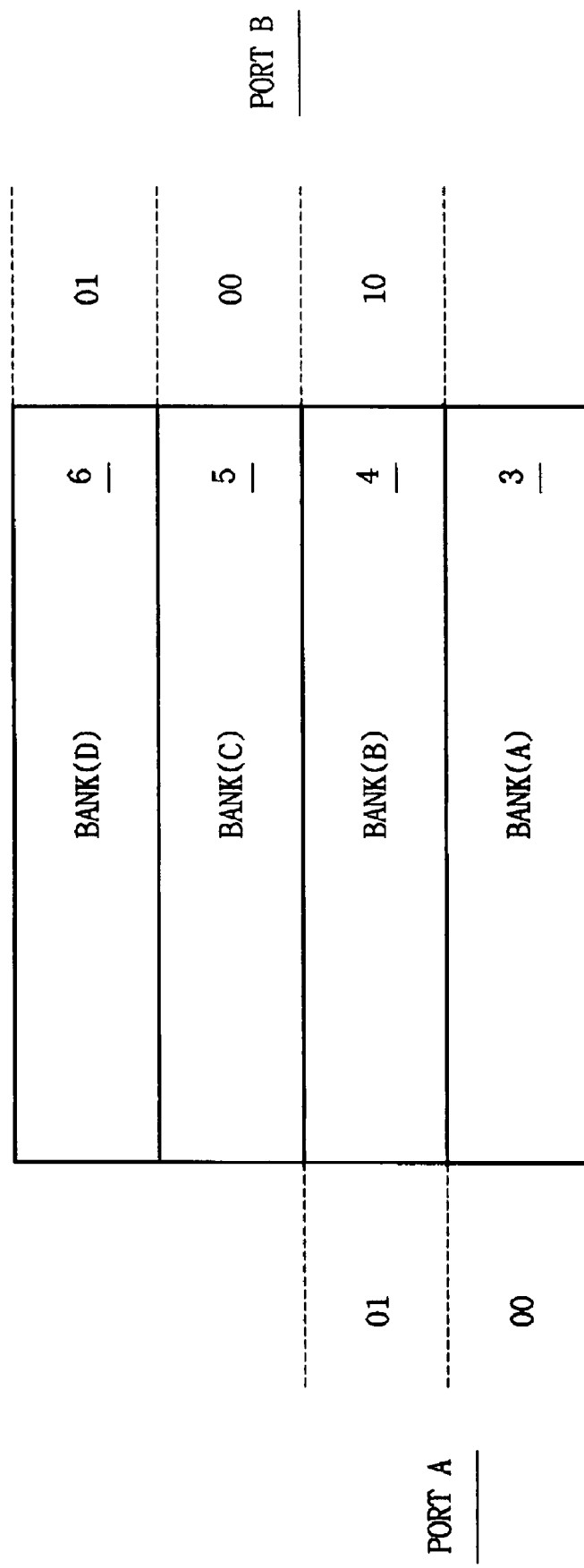

In the example embodiment of FIG. 8, in order to cause starting addresses for the first and second memory banks 3 and 5, to become equal in an initial booting of the system, the first and second memory banks 3 and 5 may be assigned the same bank address through the first and second ports PO1 and PO2. Also, the third memory bank 4, which is the shared memory bank, may be assigned different bank addresses through the first and second ports PO1 and PO2, respectively. The fourth memory bank 6 may be applied through the second port PO2, and may be assigned as an upper or higher bank address than a bank address of the second memory bank 5. The starting address may refer to a starting bank address or starting memory cell address (e.g., 0×000000h). Accordingly, in an example, a bank address for memory bank A, 3 may be assigned as "00" through first port PO1, and bank addresses for memory banks C, 5 and D, 6 may be assigned as "00" and "01", respectively, through second port PO2. Bank addresses for memory bank B, 4 may be different through the respective ports PO1 and PO2, such that the bank address for memory bank B, 4 may be "01" through the first port PO1 and "10" through the second port PO2.

In the example embodiment of FIG. 8, the memory bank A, 3 and the memory bank C, 5 may be private memory banks for the first and second processors 10 and 12, respectively (e.g., in an initial booting process). Also, as shown in the example embodiment of FIG. 8, a bank address "11" may not be applied through the first and second ports PO1 and PO2 to designate one of the memory banks.

In an example, an operation in an operating system using processors or an address mapping of firmware may be improved by assigning bank addresses so that starting bank addresses of private memory areas respectively corresponding to different ports are equal, such as illustrated in the example embodiment of FIG. 8.

Figure 9:
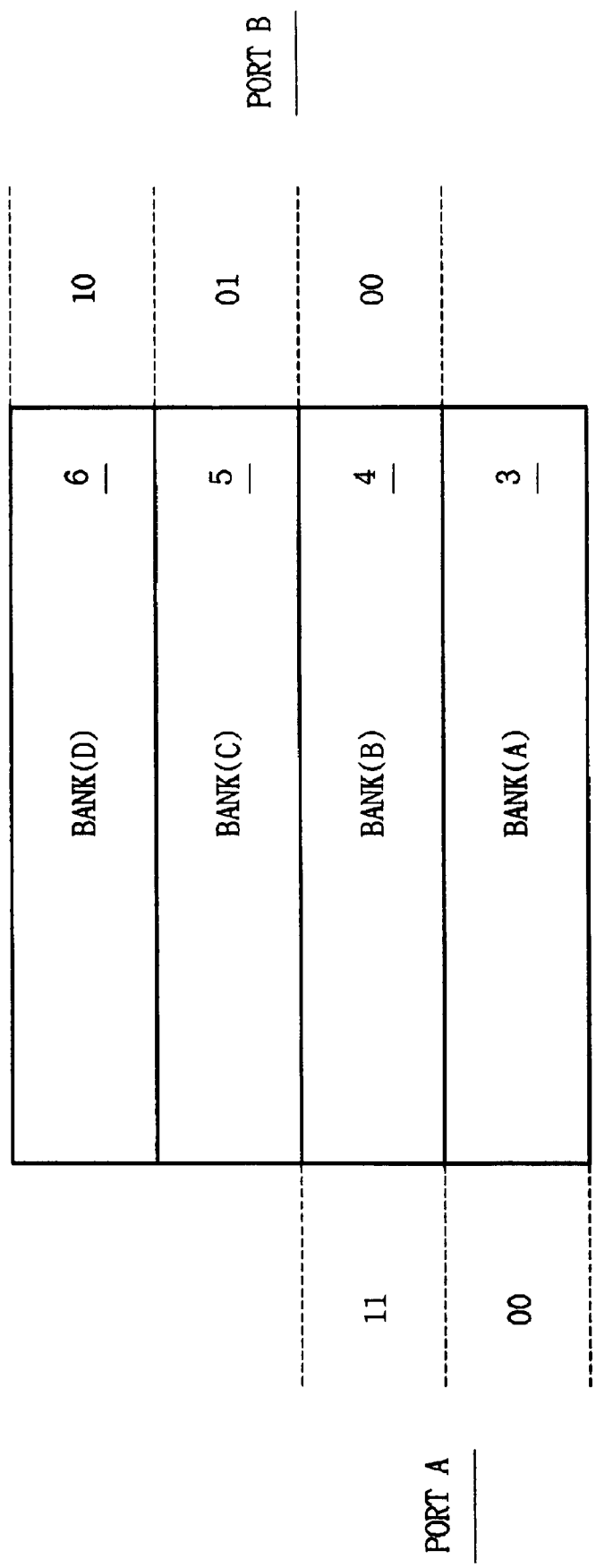

In the example embodiment of FIG. 9, the first and second memory banks 3 and 5 may be assigned different bank addresses through the first and second ports PO1 and PO2, and the third memory bank 4 may be assigned as different bank addresses through the first and second ports PO1 and PO2, respectively. A bank address to select the fourth memory bank 6 may be applied through the second port PO2, and may be assigned as an upper or higher bank address than a bank address of the second memory bank 5. Accordingly, in an example, a bank address for memory bank A, 3 may be assigned as "00" through first port PO1, and bank addresses for memory banks C, 5 and D, 6 may be assigned as "01" and "10", respectively, through second port PO2. Bank addresses for memory bank B, 4 may be differently assigned as "01" through first port PO1 and as "10" through second port PO2. Also, a bank address for memory bank B, 4 may be a shared memory bank assigned as "11" through first port PO1, and as "00" through second port PO2. In the example embodiment of FIG. 9, an access priority may be given to a processor connected to the second port PO2 in an initial booting.

Figure 10:
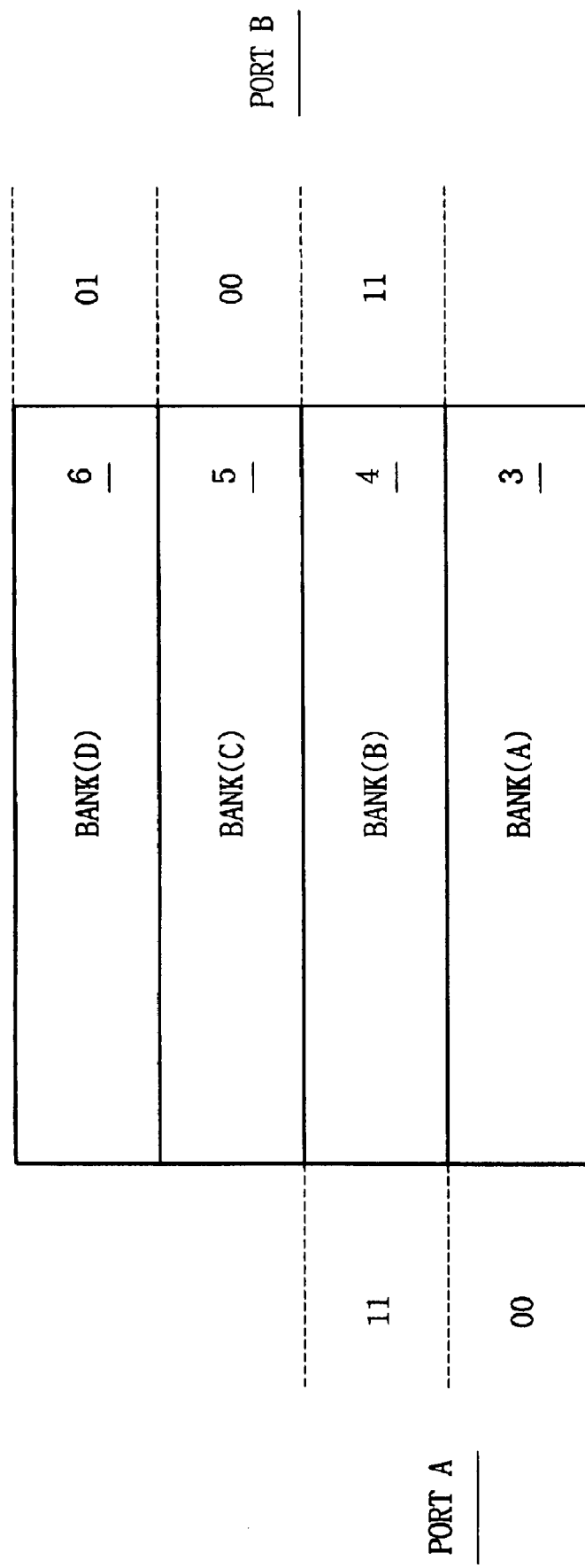

In the example embodiment of FIG. 10, the first and second memory banks 3 and 5 may be assigned the same bank address through the first and second ports PO1 and PO2. Also, bank addresses to select the third memory bank 4 may be assigned as the same bank address through the first and second ports PO1 and PO2. A bank address to select the fourth memory bank 6 may be applied through the second port PO2, and may be assigned as an upper or higher bank address than a bank address of the second memory bank 5. Accordingly, in an example, a bank address for memory bank A, 3 may be assigned as "00" through first port PO1, and bank addresses for memory banks C, 5 and D, 6 may be assigned as "00" and "01", respectively, through second port PO2. Bank addresses for memory bank B, 4 may be equal as "11" for the first and second ports PO1 and PO2. In the example embodiment of FIG. 10, the memory bank A, 3 and the memory bank C, 5 may be accessed as the shared memory bank by the first and second processors 10 and 12, respectively, in an initial booting.

Figure 11:
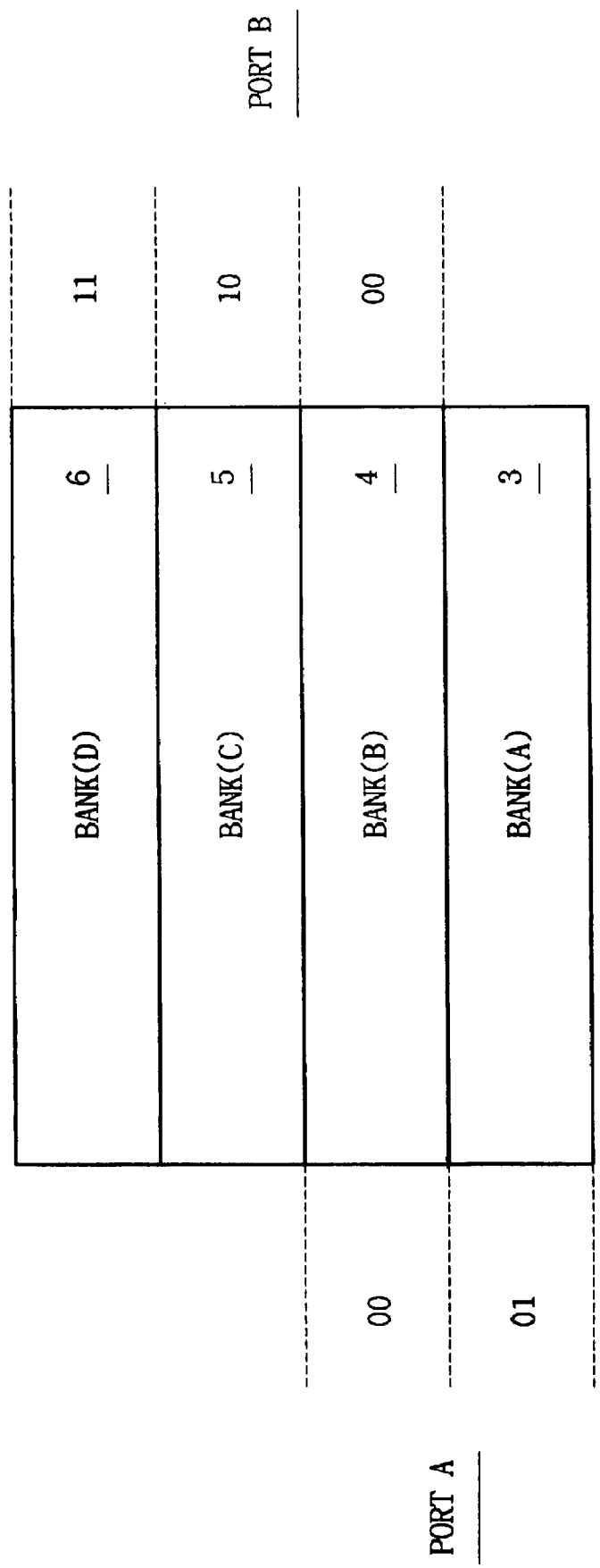

In the example embodiment of FIG. 11, the third memory bank 4 may be assigned as the same bank address through the first and second ports PO1 and PO2. A bank address to select the fourth memory bank 6 may be applied through the second port PO2, and may be assigned as an upper or higher bank address than a bank address of the second memory bank 5. Accordingly, a bank address for memory bank A, 3 may be assigned "01" through the first port PO1, and bank addresses for memory banks C, 5 and D, 6 may be assigned "10" and "11", respectively, through the second port PO2. Bank addresses for memory bank B, 4 may each be equally assigned "00" through the first and second ports PO1 and PO2. In an example, in FIG. 11, each processor may determine a shared memory bank with a starting address, or lowermost address (e.g., "00").

Figure 12:
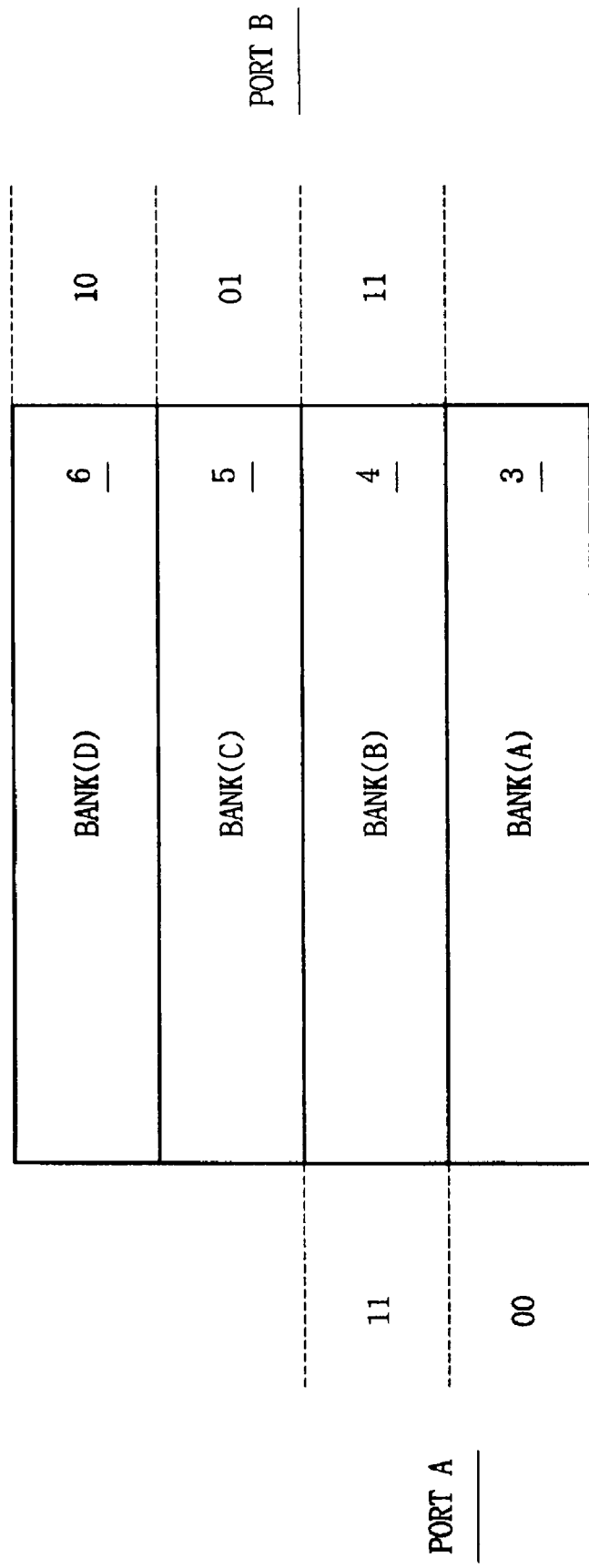

In the example embodiment of FIG. 12, a bank address for memory bank A, 3 may be assigned "00" through the first port PO1, and bank addresses for memory banks C, 5 and D, 6 may be assigned "01" and "10", respectively, through the second port PO2. Bank addresses for memory bank B, 4 may be equally assigned as "11" through the first and second ports PO1 and PO2. In an example, in FIG. 12, each processor may determine a shared memory bank with an uppermost or highest address (e.g., "11").

FIG. 13 is a table illustrating an assignment of bank addresses of FIGS. 7 to 12 according to another example embodiment of the present invention.

In the example embodiment of FIG. 13, case 1 may correspond to FIG. 7, case 2 may correspond to FIG. 8, case 3 may correspond to FIG. 9, case 4 may correspond to FIG. 10, case 5 may correspond to FIG. 11, and case 6 may correspond to FIG. 12. For example, in case 2, bank addresses for a shared memory bank may not be equal to each other (e.g., "01" and "10", respectively) and starting bank addresses may be equal to each other (e.g., "00").

Figure 14:
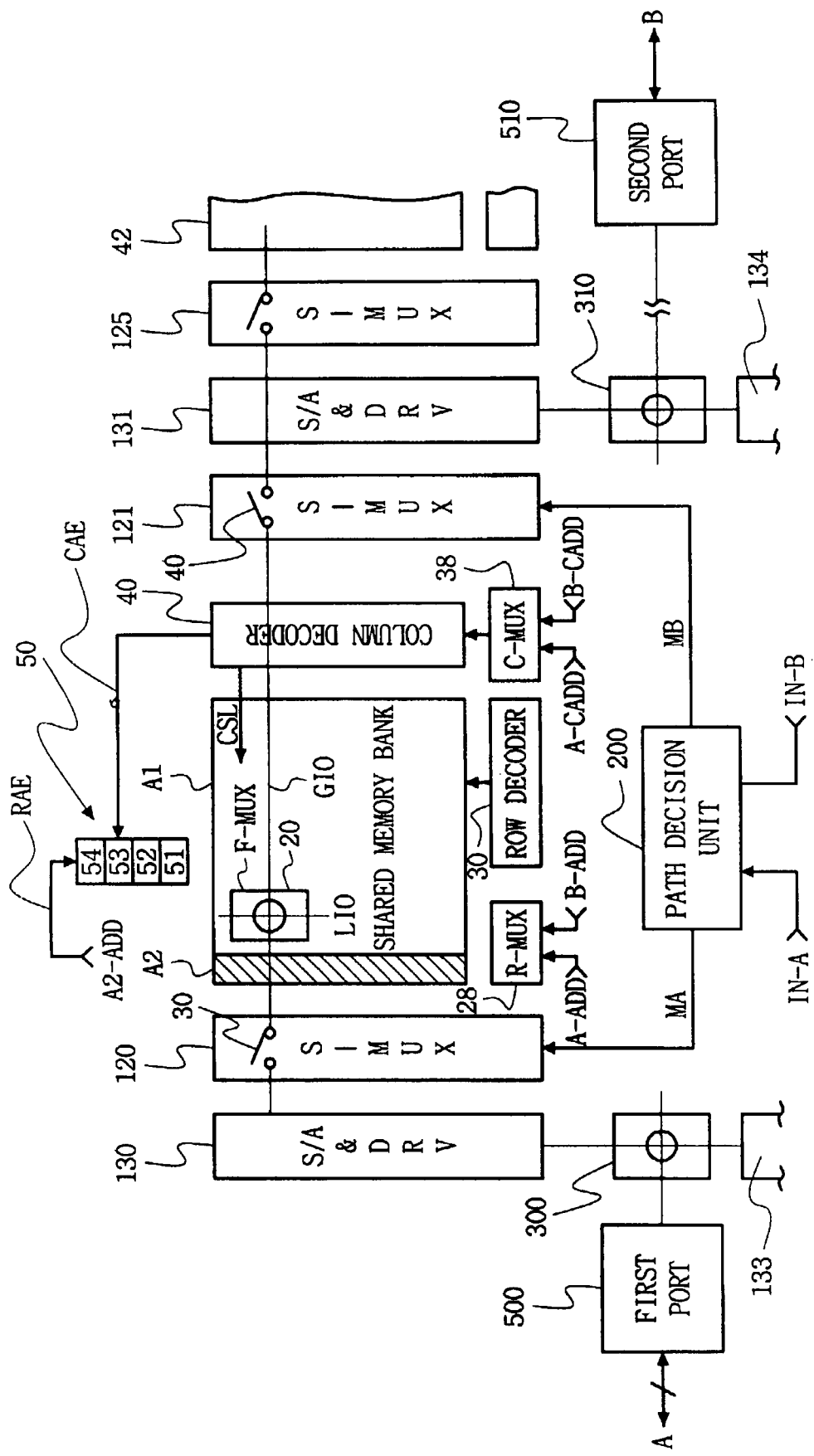
FIG. 14 illustrates a shared memory bank according to another example embodiment of the present invention.

FIG. 14 illustrates a shared memory bank 4 in the semiconductor memory device of FIG. 6 according to another example embodiment of the present invention. An interface unit, such as a register or buffer, may be adapted within a DRAM to provide an interface between processors through the DRAM. The interface unit may have a semaphore area and mailbox areas, which may be familiar to/expected by processing system developers. A designated row address (e.g., 1FFF800h~1FFFFFFh, 2 KB size=1 row size) to enable a given optional row of a shared memory area within the DRAM may be variably assigned to an internal register as the interface unit. Thus, if the designated row address (e.g., 1FFF800h~1FFFFFFh) is applied, a corresponding designated word line of the shared memory area may be disabled, while the interface unit may be enabled.

An example multipath access operation of a multipath accessible DRAM will hereinafter be described with reference to the example embodiment of FIG. 14.

In the example embodiment of FIG. 14, for example, if the first processor 10 accesses to the shared memory bank A1 through first port 500, the second processor 12 may concurrently (e.g., simultaneously) access another memory area through second port 510. The multipath access operation may be realized through an access path forming unit in which a path decision unit 200 of FIG. 14 may be included.

In the example embodiment of FIG. 14, the shared memory bank A1 may be accessible by each of the first and second processors 10 and 12, and a global input/output line GIO within the shared memory area A1 may be selectively coupled to one of first and second ports 500 and 510 connected each corresponding to the first and second processors 10 and 12. The selective connection may be realized through a control operation of the path decision unit 200.

In the example embodiment of FIG. 14. the path decision unit 200 of the access path forming unit may generate a path decision signal MA, MB to form a data access path between a given port selected from the ports A and B and the shared memory area A1, in response to external signals IN_A and IN_B applied from the first and second processors 10 and 12. The external signals may include a row address strobe signal RASB, a write enable signal WEB and a bank selection address BA each applied through the first and second ports 500 and 510.

In the example embodiment of FIG. 14, the access path forming unit may include row and column address multiplexers 28 and 38, first and second global multiplexers 120 and 121, and an input/output related path unit. The row and column address multiplexer 28, 38 may select a given row and column address A_ADD, A_CADD from row and column addresses A_ADD, B_ADD, A_CADD, B_CADD each applied through the first and second ports 500 and 510 in response to the path decision signal MA, MB, and the selected addresses may be applied to a row decoder 30 and a column decoder 40, respectively, coupled to the shared memory area A1.

In the example embodiment of FIG. 14, the first, second global multiplexer 120, 121 may connect a global input/output line GIO of the shared memory area A1 to a first or second port in response to the path decision signal MA, MB. The input/output related path unit may include a first input/output related circuit 130, 300 installed between the first global multiplexer 120 and the first port 500, and a second input/output related circuit 131, 310 installed between the second global multiplexer 121 and the second port 510. The first input/output related circuit may include an input/output sense amplifier operationally connected to the first global multiplexer 120, and a data input/output driver.

In the example embodiment of FIG. 14, in an example, a plurality of memory cells disposed in a matrix construct of rows and columns in the shared memory area A 1 may correspond to DRAM memory cells, with each DRAM cell including an access transistor and a storage capacitor.

In the example embodiment of FIG. 14, for a given shared memory area A1, two input/output sense amplifier and write drivers 130 and 131 may be disposed, and the first and second global multiplexers 120 and 121 may perform a mutually complementary switching operation. The first and second processors 10 and 12 may share circuit devices and lines provided between the global input/output line GIO and a memory cell in performing an access operation, and may independently use input/output related circuit devices and lines of from each port to the global multiplexer 120, 121.

In the example embodiment of FIG. 14, the first and second processors 10 and 12 may share the global input/output line GIO of the shared memory area A1, a local input/output line LIO operationally coupled to the global input/output line, a bit line BL operationally connected to the local input/output line through a column selection signal CSL, a bit line sense amplifier installed on the bit line, for sensing and amplifying data of the bit line, and a memory cell including an access transistor AT connected to the bit line, through the first and second ports.

In the example embodiment of FIG. 14, the path decision unit 200 may include a plurality of logic gates, and may receive a row address strobe signal RASB_A,B, a write enable signal WEB_A,B and a bank selection address BA_A,B each applied through the first and second ports 500 and 510. If a row address strobe signal RASB is first applied through one port of the ports, the path decision unit 200 may generate path decision signal MA, MB so as to arrange the shared memory area A1 for the used port. If row address strobe signals RASB are applied concurrently (e.g., simultaneously), a processor having sufficient priority may obtain access to the shared memory area A1.

For example, if the first processor 10 accesses the shared memory area A1 as a shared bank to perform a read operation, the path decision unit 200 of FIG. 14 may logically combine external signals applied from the first processor 10, and may activate the path decision signal MA, and need not activate the path decision signal MB. The row address multiplexer 28 may select a row address A_ADD applied through the first port A, and may applies the selected row address A_ADD to the row decoder 30. A word line WLi within the shared memory area A1 accessed by the first processor 10 may be activated by the row decoder 30. If the word line WLi is activated, data of memory cells in which gates of access transistors are connected to the same word line may be developed to a corresponding bit line. The bit line sense amplifier may sense and amplify the developed data (hereinafter, referred to as "bit line data") and may transfer the bit line data to a corresponding local input/output line LIO if a column gate responding to an activation of column selection signal CSL is turned on. The turn-on operation of the column gate will now be described in greater detail. The word line WLi may be activated such that data of a memory cell may appear as a potential of a first logic level (e.g., a higher logic level or logic "1") or a second logic level (e.g., a lower logic level or logic "0") on the bit line, and the column address multiplexer 38 may select column address A_CADD of first port A and may output the selected column address to the column decoder 40. The column decoder 40 may activate a column selection signal that selects a column to be accessed by the first processor 10.

In the example embodiment of FIG. 14, data of the local input/output line LIO may be transferred to a global input/output line GIO if transistors constituting a first multiplexer 20, LIO MUX are turned on. A switching signal applied in common to gates of the transistors may be generated in response to a decoding signal output from the row decoder 30.

In the example embodiment of FIG. 14, the path decision signal MA may be output at an activated state, and the data transferred to the global input/output line GIO may be transferred to the global input/output sense amplifier and driver 130. The input/output sense amplifier may again amplify data which has "weakened" (e.g., lowered in potential) in the transfer procedure of the data passing through paths, and may transfer the amplified data to the first port 500 through a multiplexer and driver 300.

In the example embodiment of FIG. 14, the second multiplexer 121 may be disabled such that an access operation of the second processor 12 to the shared memory area A1 may be cut off. However, the second processor 12 may access private memory areas except the shared memory area A1 through the second port 510. In an example, a determination for the size or number of the memory areas may be based upon a level of operation for the first and/or second processors.

As shown in the example embodiment of FIG. 14, a plurality of processor may obtain common access to a semiconductor memory device having a single chip and a shared memory area. For example, from among four memory areas, one memory area may be designated as a shared memory area and the remaining three memory areas may be designated as private memory areas. Alternatively, each of four memory areas may be allocated as a commonly shared memory area. In addition, although the system employing two processors is described above as a representative example, it is understood that other example embodiments may be directed to any number of processors having common access to shared memory.

Example embodiments of the present invention being thus described, it will be obvious that the same may be varied in many ways. For example, it is understood that the above-described first and second logic levels may correspond to a higher level and a lower logic level, respectively, in an example embodiment of the present invention. Alternatively, the first and second logic levels/states may correspond to the lower logic level and the higher logic level, respectively, in other example embodiments of the present invention.

Further, while above-described example embodiments of the present invention are described as directed to DRAM, it is understood that other example embodiments of the present invention may be directed to any well-known type of memory, such as static random access memory (SRAM), non-volatile memory, etc.

Further, it is understood that a configuration of a bank or circuit within a memory may vary from application to application. Accordingly, while particular memory bank and circuit configurations are above described, it is understood that other example embodiments of the present invention may have other configurations.

Such variations are not to be regarded as a departure from the spirit and scope of example embodiments of the present invention, and all such modifications as would be obvious to one skilled in the art are intended to be included within the scope of the following claims.

What is claimed is:

1. A method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising:
assigning bank addresses to select the first and second memory banks, as respectively separate bank addresses through the first and second ports; and
assigning bank addresses to select the third memory bank, as the same bank address through the first and second ports.

2. A method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising:
assigning bank addresses to select individually the first and second memory banks, as the same bank address through the first and second ports, so that starting addresses for the first and second memory banks become equal in booting; and
assigning bank addresses to select the third memory bank, as different bank addresses through the first and second ports.

3. The method of claim 2, wherein the starting address is a starting bank address or staring memory cell address.

4. A method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising:
assigning bank addresses to select individually the first and second memory banks, as different bank addresses through the first and second ports; and
assigning bank addresses to select the third memory bank, as different bank addresses through the first and second ports.

5. A method of assigning bank addresses to select banks, in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising:
assigning bank addresses to select individually the first and second memory banks, as the same bank address through the first and second ports, so that starting addresses for the first and second memory banks become equal in booting; and
assigning bank addresses to select the third memory bank, as the same bank address through the first and second ports.

6. A method of assigning bank addresses to select banks in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising:
assigning bank addresses to select the first and second memory banks, as respectively separate bank addresses through the first and second ports; and
assigning bank addresses to select the third memory bank, as the same bank address through the first and second ports, so that starting addresses for the third memory bank become equal in the first and second ports in booting.

7. A method of assigning bank addresses to select banks in a semiconductor memory device having a memory cell array, the memory cell array including a first memory bank coupled to a first processor through a first port, a second memory bank coupled to a second processor through a second port, and a third memory bank shared and connected with the first and second processors through the first and second ports, the method comprising;

assigning bank addresses to select the first and second memory banks, as respectively separate bank addresses through the first and second ports; and assigning bank addresses to select the third memory bank, as the same bank address through the first and second ports, so that memory cell addresses for the third memory bank become equal in the first and second ports in booting.

8. A method of assigning bank addresses to select banks, in a semiconductor memory device having a memory cell array, the memory cell array including a first memory bank coupled to a first processor through a first port, second and fourth memory banks coupled to a second processor through a second port, and a third memory bank shared and connected with the first and second processors through the first and second ports, the method comprising:

assigning bank addresses to select individually the first and second memory banks, as the same bank address through the first and second ports, so that starting addresses for the first and second memory banks become equal in booting;

assigning bank addresses to select the third memory bank, as different bank addresses through the first and second ports; and assigning, through the second port, bank addresses to select the fourth memory bank, as the same bank address as a bank address to select the third memory bank through the first port, whereby with an unused bank address.

9. A data communication system comprising:

first and second processors;

a volatile semiconductor memory device having a memory cell array, the memory cell array including a first memory bank coupled to the first processor through a first port, a second memory bank coupled to the second processor through a second port, and a third memory bank shared and connected with the first and second processors through the first and second ports; and a bank address assigning unit, the bank address assigning unit being operationally connected between the first and second processors and the volatile semiconductor memory device, and being for assigning bank addresses to select individually the first and second memory banks, as the same bank address through the first and second ports, so that starting addresses for the first and second memory banks become equal in booting, and being for assigning bank addresses to select the third memory bank, as different bank addresses through the first and second ports.

10. A data processing system comprising:

first and second processors;

a dynamic random access memory having a memory cell array, the memory cell array including a first memory bank coupled to the first processor through a first port, second and fourth memory banks coupled to the second processor through a second port, and a third memory bank shared and connected with the first and second processors through the first and second ports; and a bank address assigning unit for assigning bank addresses to select individually the first and second memory banks, as the same bank address through the first and second ports, so that starting addresses for the first and second memory banks become equal in booting, and assigning bank addresses to select the third memory bank, as different bank addresses through the first and second ports, and assigning, through the second port, bank addresses to select the fourth memory bank, as the same bank address as a bank address to select the third memory bank through the first port.

11. A method of assigning bank addresses, in a multipath accessible semiconductor memory device including at least one shared memory area and private memory areas in a memory cell array, the at least one shared memory area being operationally connected with ports independently installed corresponding to the number of plural processors, and being selectively accessed by the plural processors, and the private memory areas being privately accessed corresponding to the plural processors, the method comprising:

assigning bank addresses so as to cause all starting bank addresses of a private memory area corresponding to each of the ports, to become equal to each other.

12. A method of assigning bank addresses, in a multipath accessible semiconductor memory device including at least one shared memory area and private memory areas in a memory cell array, the at least one shared memory area being operationally connected with ports independently installed corresponding to the number of plural processors, and being selectively accessed by the plural processors, and the private memory areas being privately accessed corresponding to the plural processors, the method comprising:

assigning bank addresses to cause all starting bank addresses of a private memory area corresponding to each of the ports become different from each other.

* * * * *